(12) United States Patent
Day

(10) Patent No.: US 8,145,604 B2
(45) Date of Patent: Mar. 27, 2012

(54) METHOD AND APPARATUS FOR RELOCATING AN ACTIVE FIVE SYSTEM JOURNAL

(75) Inventor: Mark S. Day, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 642 days.

(21) Appl. No.: 11/975,487

(22) Filed: Oct. 19, 2007

(65) Prior Publication Data

US 2009/0106334 A1  Apr. 23, 2009

(51) Int. Cl.
*G06F 7/00* (2006.01)
*G06F 17/00* (2006.01)

(52) U.S. Cl. ........ 707/648; 707/672; 707/822; 711/173; 711/165

(58) Field of Classification Search .............. 707/10, 707/8, 648, 672, 821, 822; 711/173, 170, 711/103, 165, 112
See application file for complete search history.

(56) References Cited

U.S. PATENT DOCUMENTS

| | | | | |
|---|---|---|---|---|
| 4,197,588 A * | 4/1980 | Cason et al. | ............... | 1/1 |
| 5,675,769 A * | 10/1997 | Ruff et al. | ............... | 711/173 |
| 5,897,661 A * | 4/1999 | Baranovsky et al. | ......... | 711/170 |
| 6,021,408 A * | 2/2000 | Ledain et al. | ............... | 707/823 |
| 6,108,759 A * | 8/2000 | Orcutt et al. | ............... | 711/173 |
| 6,178,487 B1 * | 1/2001 | Ruff et al. | ............... | 711/165 |
| 6,185,575 B1 * | 2/2001 | Orcutt | ............... | 1/1 |
| 6,453,383 B1 * | 9/2002 | Stoddard et al. | ............... | 711/112 |
| 6,609,187 B1 * | 8/2003 | Merrell et al. | ............... | 711/173 |
| 6,732,125 B1 * | 5/2004 | Autrey et al. | ............... | 707/640 |
| 7,406,473 B1 * | 7/2008 | Brassow et al. | ............... | 1/1 |
| 7,640,388 B2 * | 12/2009 | Nakashima et al. | ......... | 711/103 |
| 2005/0182771 A1* | 8/2005 | Grubbs et al. | ............... | 707/100 |
| 2006/0092794 A1* | 5/2006 | Takashima et al. | ......... | 369/53.2 |
| 2007/0106712 A1* | 5/2007 | Yamato et al. | ............... | 707/204 |
| 2008/0077590 A1* | 3/2008 | Pandit | ............... | 707/8 |

* cited by examiner

*Primary Examiner* — Giovanna Colan
(74) *Attorney, Agent, or Firm* — Blakely, Sokoloff, Taylor & Zafman LLP

(57) ABSTRACT

Relocating a file system journal within a partitioned memory space is described. In one embodiment, a method, which involves relocating an active file system journal, includes writing the changes for relocating the metadata structures into the new file system journal before the file system journal is activated so that journaling remains active during relocation and the corresponding file system remains consistent throughout the relocation.

25 Claims, 14 Drawing Sheets

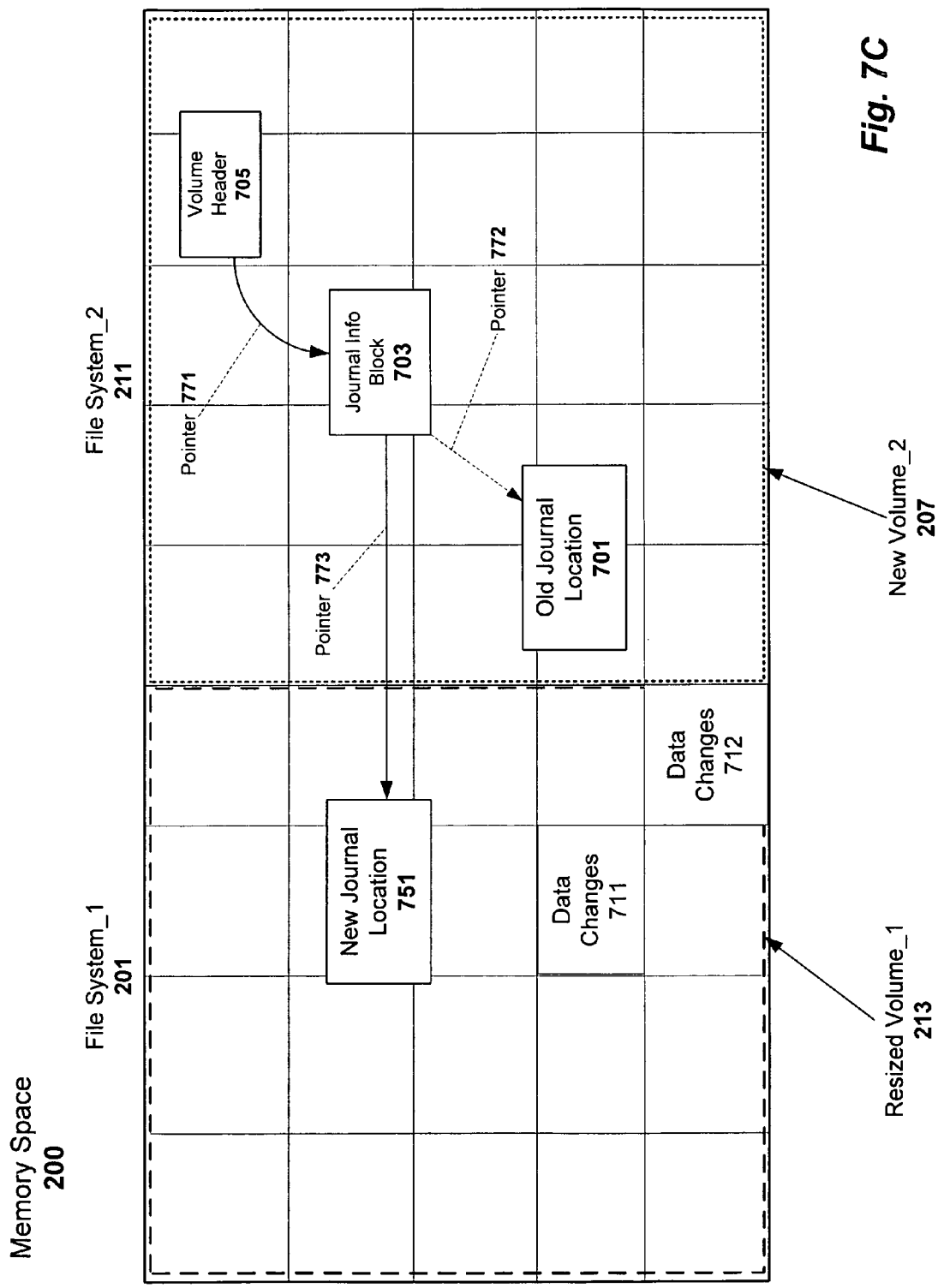

METHOD AND APPARATUS FOR RELOCATING AN ACTIVE FIVE SYSTEM JOURNAL

FIELD OF THE INVENTION

The invention relates generally to file systems and the management thereof.

BACKGROUND OF THE INVENTION

A file system journal is used to provide more efficient (and sometimes, more accurate) repair of a file system in the event of a crash, power outage, or other failure to properly un-mount the file system, compared to a file system without a journal or similar mechanism. A journal is used to speed recovery when mounting a volume that was not un-mounted safely. Journaling makes it quick and easy to restore the file system data structures to a consistent state without having to scan all the structures.

In a journaling file system, a journal entry is written before each file system change, describing the change to be carried out. This allows quick recovery if the actual file change is interrupted or not carried out due to power outage or whatever. Journaling does not protect your (new) data, it just prevents inconsistencies. Data changes are written to the journal before committing the data changes to physical disk. Once the data has been safely confirmed as being on disk, the record is erased in the journal. If a failure occurs while writing to the journal, the original data is still in a consistent state except that the new, pre-crashed data that was being written is lost. What a journaling file system really protects against are situations where the power is cut off in the middle of a write, and the file system gets left in an unstable state. By using a journaling process, if the power does click off, any half-completed operations can be replayed and brought back into a stable state. Basically, journaling ensures that when a group of related changes are being made, either all of those changes are actually made, or none of them are made. This is done by gathering up all of the changes, and storing them in a separate place (in the journal). Once the journal copy of the changes is completely written to disk, the changes can actually be written to their normal locations on disk. If a failure happens at that time, the changes can simply be copied from the journal to their normal locations. If a failure happens when the changes are being written to the journal, but before they are marked complete, then those changes are ignored.

When a file system is updated (for example, to create or delete a file), several data structures within the file system typically need to be changed. The journal is used to ensure that all or none of these changes are actually applied. The changes are all written to the journal, and the journal header is updated to indicate that all the changes have been made. After the changes to the journal and journal header have been written to disk, then those changes may be written to the normal data structures. In the event of a crash after the journal header has been written, but before the changes have been written to the normal data structures, the changes can be "replayed" by reading them from the journal, and writing to the normal data structures. This ensures that all the changes have been made. In the event of a crash before the journal header has been written, then the incomplete changes in the journal are ignored, and none of the changes will have been made to the normal data structures. Thus, every update is "all or nothing." Once all changes have been written to the normal data structures, the changes can be removed from the journal by updating the journal header. Without a journal or a similar mechanism, you would have to verify and potentially repair every data structure in the file system, which can take a very long time.

Some data processing systems available today are operable to include more than one file system currently running on a host processor. These systems allow for more than one operating system to function on the same hardware. For example, a system may contain both a Mac OS-based operating system and a Microsoft Windows-based operating system. However, in order to maintain compatibility, two separate files systems are needed, each potentially requiring its own contiguous space within the system's physical memory space. When a second file system is placed within the memory of such a system, the physical memory space should be partitioned into two contiguous regions and the first file system must be resized in order to make room on the disk to install the second operating system.

One problem that arises is that the resized file system now corresponds to a smaller area (or volume) on a memory space and may have data structures located in the new volume corresponding to the second file system placed on a memory space within such a system. The resized file system may be currently storing data or other structures in the location where the new file system will be put, and the content of the resized file system must be relocated to make room for the new file system. Many operating systems in use today do not have a mechanism to relocate the file system data structures, which results in failure of the associated volume upon resizing and a user will be prevented from installing the dual file system in the partitioned memory space.

Another problem is that the normal file system data structures must be updated in order to change the location of the journal. For example, the blocks occupied by the old journal must be freed, the blocks occupied by the new journal must be allocated, and the location of the journal in its catalog file record must be updated. None of the updates may be written until after the new journal has been set up and made active. If there was a crash or power outage after the new journal was made active, but before the corresponding changes to the normal data structures were written, the file system would be damaged, defeating the purpose of a journal. If those changes were written to the old journal as they normally would, they would not be automatically replayed because they were not active (new) in an active journal. The normal method of making changes to the file system data structures involves starting a transaction, adding modified blocks to the transaction, then ending the transaction. When the transaction is ended, the modified blocks are written to the journal, the journal header is updated to indicate that the transaction is complete and valid, and then the modified blocks are written to the normal data structures within the physical memory space. But this won't work for relocating the journal itself, since the modified blocks might get written to the journal data structures before the journal info block has been updated to point to the new journal, as mentioned above.

SUMMARY OF THE INVENTION

Methods and apparatuses for relocating an active file system journal in a memory space are disclosed. In at least certain embodiments, the active file system journal is relocated in response to resizing a file system located within the memory space, the relocating including: allocating a location in the resized file system for a new file system journal and writing data structure changes for relocating the file system journal into the new journal before activation.

BRIEF DESCRIPTION OF THE DRAWINGS

A better understanding of at least certain embodiments of the present invention can be obtained from the following detailed description in conjunction with the following drawings, in which:

FIG. 7C illustrates updating a journal info block to reference a new file system journal within an exemplary partitioned memory space containing a resized volume associated with a first file system and a new volume associated with a second file system.

DETAILED DESCRIPTION

Figure 1:
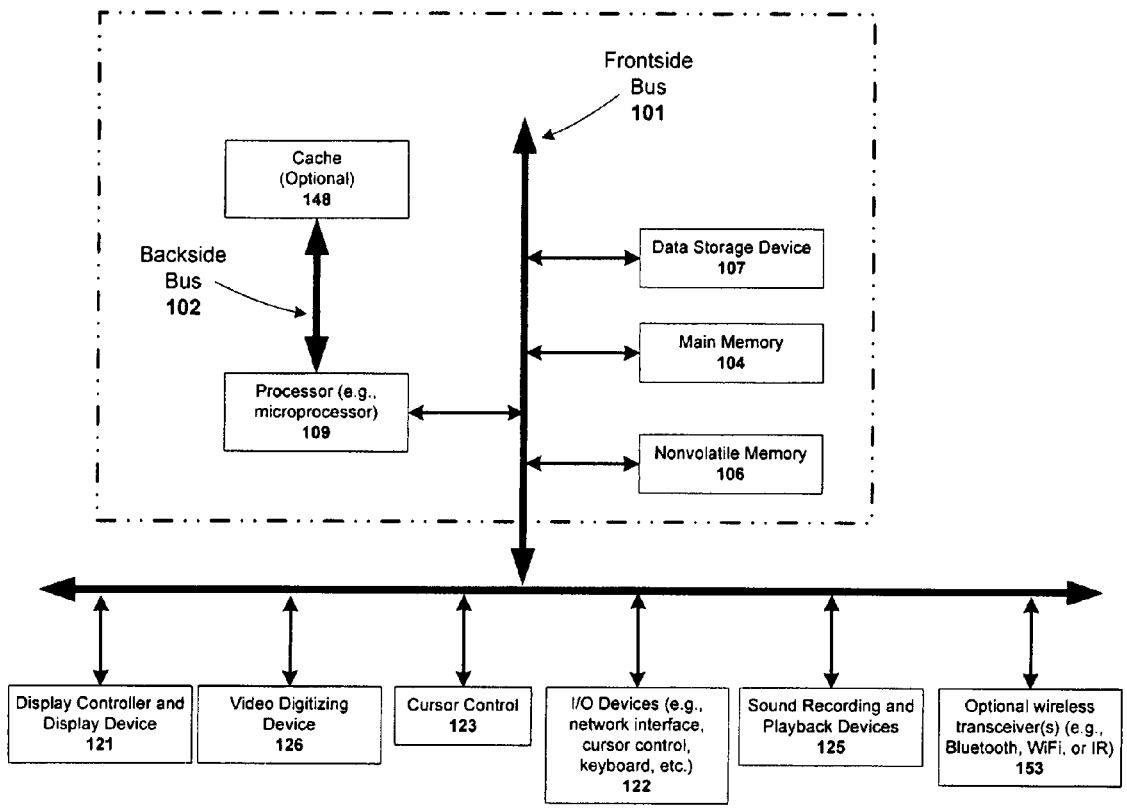
FIG. 1 illustrates an exemplary computer system upon which the methods and apparatuses of the invention may be implemented.

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems will appear from the description below. In addition, the present invention is not described with reference to any particular programming language. It will be appreciated that a variety of programming languages may be used to implement the teachings of the invention as described herein.

A method and apparatus for relocating an active file system is described. As discussed above, file system metadata structures must be updated in order to change the location of a file system journal. However, this will not work for relocating a file system journal itself since the modified blocks might get written to the normal data structures before the journal info block has been updated to point to the new journal. Additionally, the journal cannot be turned off without incurring a large time expense to verify and repair a volume that was damaged as a result of a crash or power outage. The solution, in at least certain embodiments of the invention, is to put the metadata structure changes for relocating the journal into the new journal before the new journal is made active. Then the data structure changes for relocating the journal may be written to their normal data structures after the new journal has been made active. In the event of a crash before the new journal is made active, the changes are not in the old (active) journal, nor in the normal data structures, so the file system maintains a consistent state, and it is as if the journal relocation was never begun. In the event of a crash after the new journal is made active, the changes to relocate the journal are in the new (active) journal, and are replayed to the normal data structures if needed, again leaving the file system consistent with a newly relocated journal.

FIG. 1 illustrates an exemplary data processing system which may be a computer system 100 upon which embodiments of the present invention can be implemented. Computer system 100 comprises front-side bus 101 and back-side bus 102 (or other communications hardware and software for communicating information) coupled to processor 109 for processing information. Front-side bus 101 is a data path which runs between the CPU and main memory (RAM). Front-side bus 101 also couples data storage device 107, main memory 104, and non-volatile memory 106 to processor 109. Additionally, front-side bus 101 connects to an external bus coupling the processor to display controller and device 121, video digitizing device 126, cursor control device 123, input-output (I/O) devices 122, sound recording and playback devices 125, and optional wireless transceivers 153. Additionally, cache 148 is coupled to processor 109 via back-side bus 102. A back-side bus, such as, back-side bus 102, is the data path and physical interface between the processor and the L1 and/or L2 cache memory (not shown).

Computer system 100 further comprises a random access memory (RAM) or other dynamic storage device (referred to as main memory 104) coupled to bus 101 for storage information and instructions to be executed by processor 109. Main memory 104 also may be used for storing temporary variables or other intermediate information during execution of instructions by processor 109. Computer system 100 also comprises a read only memory (ROM) 106, and/or static storage devices coupled to bus 101 for storing static information and instructions for processor 109. Data storage device 107 is coupled to bus 101 for storing information and instructions.

Furthermore, data storage device 107 may include a magnetic disk or optical disk and its corresponding disk drive, which can be coupled to computer system 100. Computer system 100 can also be coupled, via bus 101, to display device 121 for displaying information to a computer user. Display device 121 typically includes a frame buffer, specialized graphics rendering devices, and a cathode ray tube (CRT) and/or a flat panel display. I/O device 122 including alpha numeric and other keys, is typically coupled to bus 101 for communication information and commands to processor 109. Another type of user input device is cursor control 123, such as a mouse, trackball, pin, touch screen, or cursor direction keys for communication direction information and command selections to processor 109 and for controlling cursor movement on display device 121. This input device typically has two degrees of freedom into axis, a first axis (e.g., x) and a second axis (e.g., y), which allows the device to specify positions in a plane. However, this invention should not be limited to input devices with only two degrees of freedom.

Another device that may be coupled to bus 101 is a device for sound recording and/or playback 125, such as an audio digitizer coupled to a microphone for recording information. Further, the device may include a speaker which is coupled to a digital-to-analog (D/A) converter for playing back the digitized sounds.

Also computer system 100 can be a terminal in a computer network (e.g., a LAN). Computer system 100 would then be a computer subsystem of a computer system including a number of networked devices. Computer system 100 optionally includes video digitizing device 126. Video digitizing device 126 can be used to capture video images and transmitted from others on the computer network.

Computer system 100 is useful for supporting computer supported cooperation (CSC—the integration of teleconferencing with mixed media data manipulation) to 2D/3D graphics, image processing, video compressions/decompression recognition algorithms and audio manipulation.

It will be understood that the various embodiments described herein may be implemented with data processing systems which have more or fewer components than system 100; for example, such data processing systems may be a cellular telephone or a personal digital assistant (PDA) or an entertainment system or a media player (e.g., an iPod) or a consumer electronic device, etc., each of which can be used to implement one or more of the embodiments of the invention.

Figure 2A:
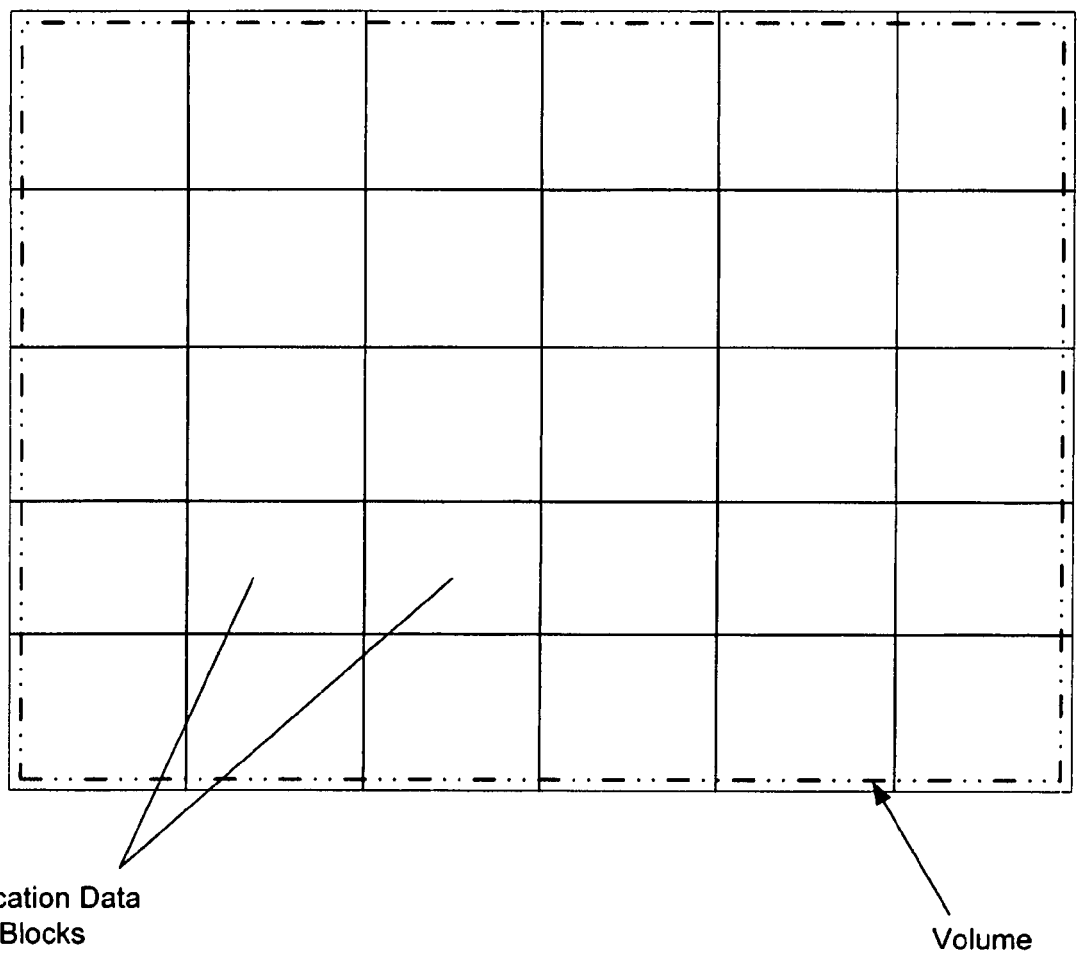
FIG. 2A illustrates an exemplary memory space containing a volume associated with a file system.

FIG. 2A illustrates an exemplary memory space containing a volume associated with a file system. Memory space 200 of FIG. 2A includes file system_1 201, allocations data blocks 205, and volume 203. File system_1 201 includes volume 203, which occupies the entire memory space 200. File system_1 201, in this example, occupies the entire volume 203 of allocation data blocks 205 in memory space 200. A volume, such as volume 203, is a set of files that contain user data along with the structure to retrieve that data. Allocation data blocks, such as allocation data blocks 205, are a group of consecutive logical blocks on a volume. As such, allocation data block 205 is a unit of storage on a volume composed of one or more logical blocks. The larger the volume, the more logical blocks comprise one allocation block.

Figure 2B:
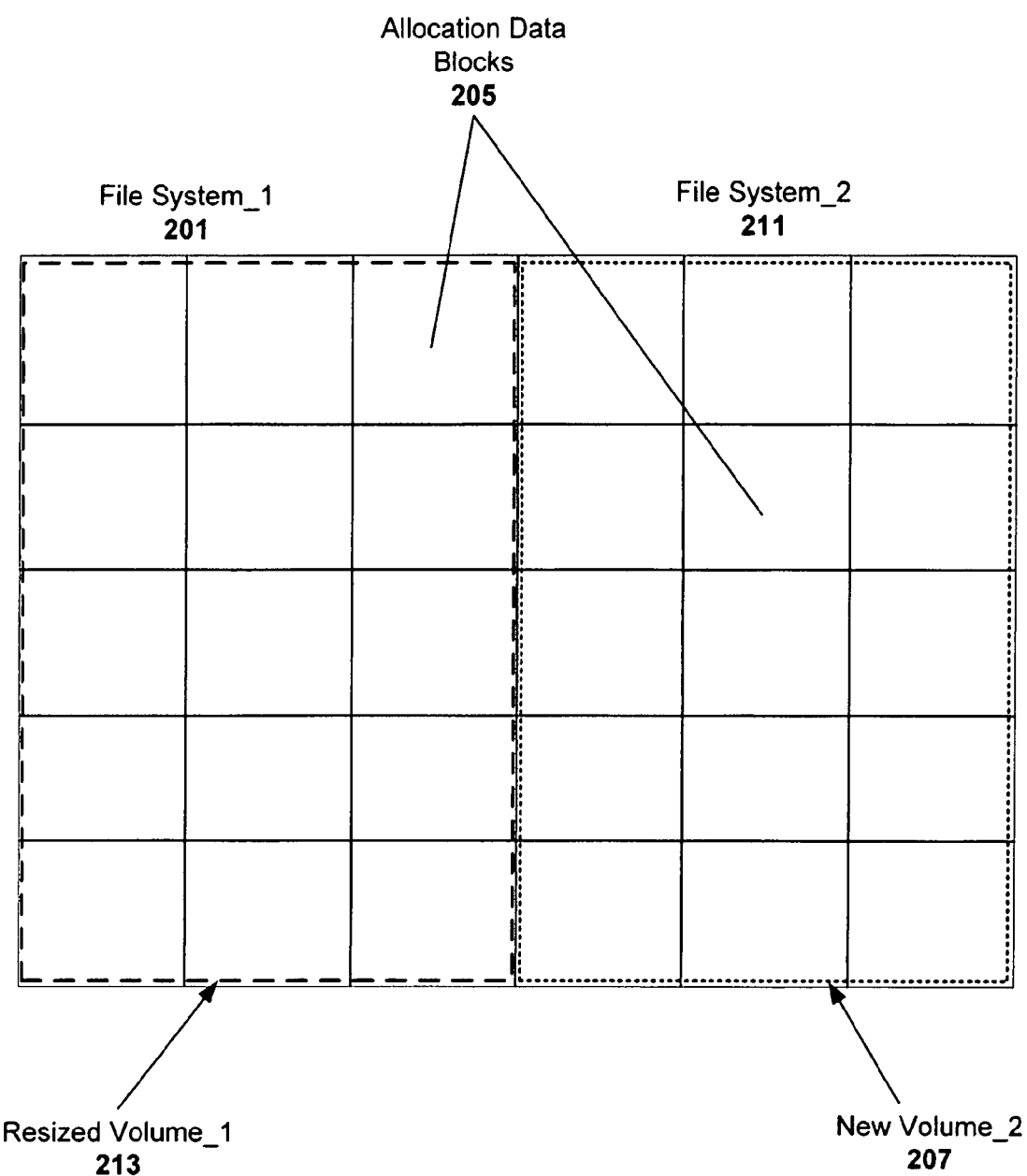
FIG. 2B illustrates an exemplary partitioned memory space containing a resized volume associated with a first file system and a new volume associated with a second file system.

FIG. 2B illustrates an exemplary partitioned memory space containing a resized volume associated with a first file system and a new volume associated with a second file system.

Memory space 200 of FIG. 2B includes file system_1 201, file system_2 211, allocation data blocks 205, resized volume_1 213, and new volume_2 207. File system_1 201 corresponds to resized volume_1 213 and file system_2 211 corresponds to new volume_2 207. Each of these volumes includes one or more allocation blocks such as allocation data blocks 205. In at least certain embodiments, file system_1 201 and file system_1 211 equally divide memory space 200 into two equal volumes. However, the invention is not so limited as any division of memory space 200 between file system_1 201 and file system_1 211 is within the scope of the invention. Dividing memory space 200 into two equal volumes allows for file system_1 201 and file system_1 211 to operate independently from one another and access the associated volumes to manage their respective file systems. For example, file system_1 201 may be the HFS PLUS file system developed by Apple, Inc. File system_2 space 211 can be any other file system such as FAT 16, FAT 32, NTFS, HPFS, AFS, and etc. In general, a file system is any data structure that translates the physical view of a disk into logical files, directories, or other structure. Essentially, a file system includes the methods and data structures that an operating system uses to keep track of files on a disk or a partition. In FIG. 2A, the memory space has been partitioned into two volumes associated with two file systems. When this is done, the first file system, such as file system_1 201, must be resized to accommodate the addition of the second file system, such as file system_1 211.

Figure 2C:
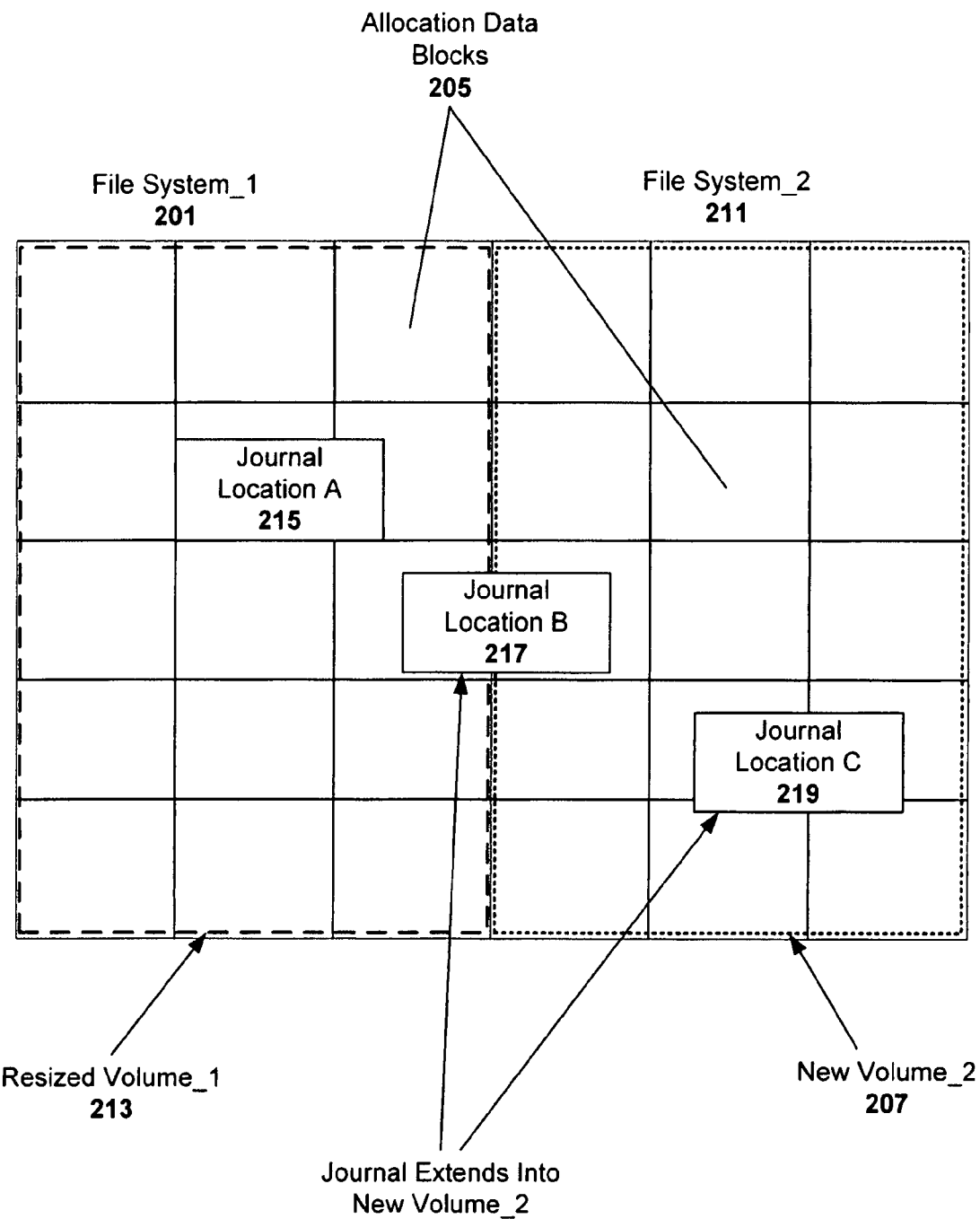
FIG. 2C illustrates a number of file system journal locations within an exemplary partitioned memory space containing a resized volume associated with a first file system and a new volume associated with a second file system.

FIG. 2C illustrates a number of file system journal locations within an exemplary partitioned memory space containing a resized volume associated with a first file system and a new volume associated with a second file system. Memory space 200 includes two file systems, file system_1 201 and file system_2 211 and their corresponding volumes, including resized volume_1 213 and new volume_2 207 respectively. In FIG. 2C, the journal is shown in three locations for the purposes of explanation. Journal location A 215 is located within resized volume_1 213 corresponding to file system_1 201. In this case, there is no need to relocate journal location A 215, because file system_1 201 is a journaling file system and journal location A 215 is within the volume associated with file system_1 201. However, in the case of the journal location B space 217 and journal location C space 219, the journal extends into new volume_2 207, and new volume_207 is not operable for journaling or requires a different journal or journaling method. Therefore, journal location B space 217 and journal location C space 219 must be relocated into resized volume_1 213 associated with the journaling file system, file system_1 201.

Figure 3:
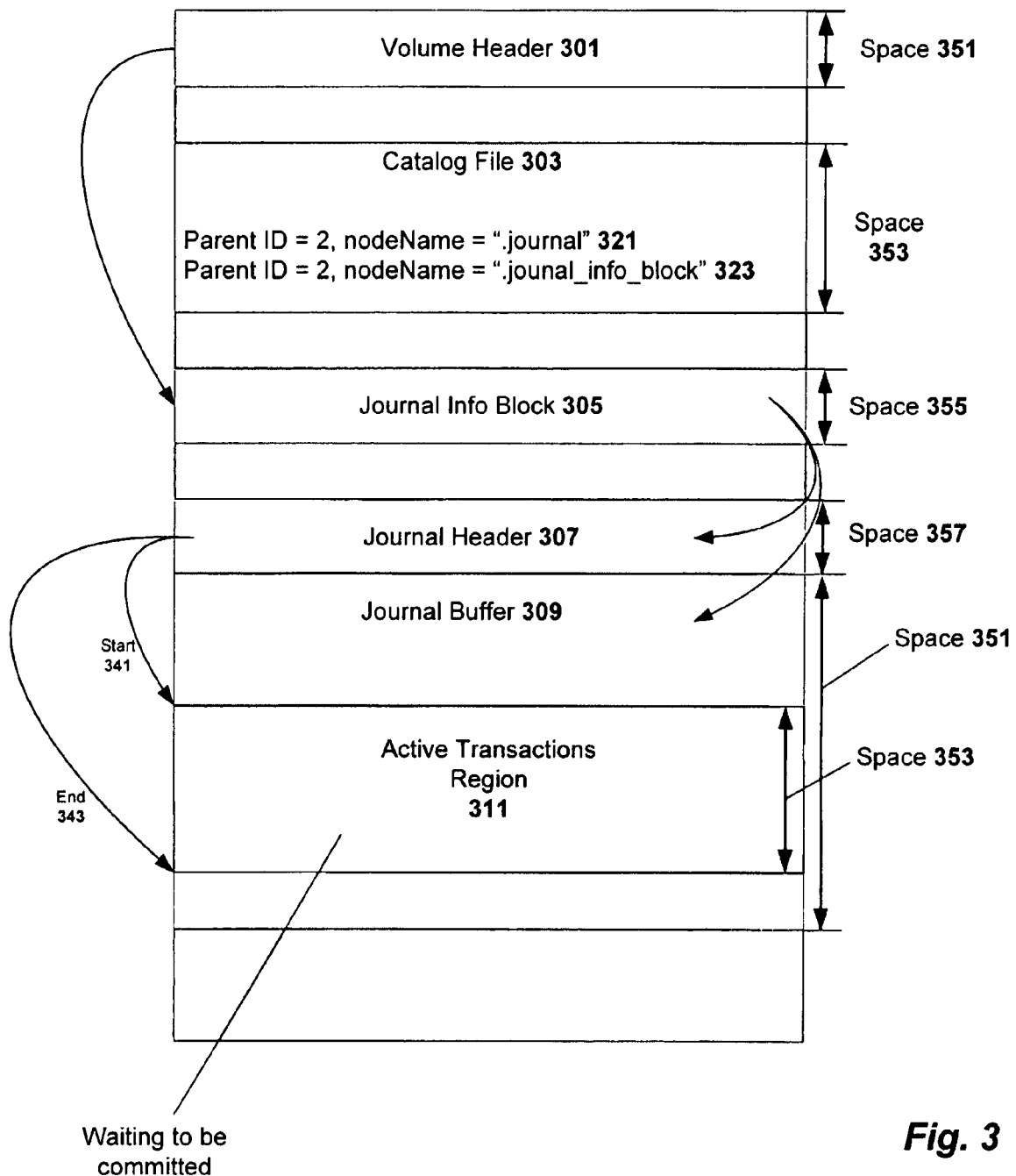
FIG. 3 illustrates an exemplary file system containing an exemplary file system journal according to one embodiment of the invention.

FIG. 3 illustrates an exemplary file system containing an exemplary file system journal according to one embodiment of the invention. File system 300 includes volume header 301, catalog file 303, journal info block 305, journal header 307, and journal buffer 309. Further, a portion of journal buffer 309 is an active transactions region 311. In the figure, the active transactions regions is shown as one contiguous space, though it need not be, and often is not, contiguous. A volume header, such as volume header 301, contains information about the volume as a whole, including key structures within the volume. Volume header 301 occupies space 351 within the allocated memory space for File System 300 and contains reference information that points to journal info block 305 as indicated by the arrow in FIG. 3. A catalog file, such as catalog file 303, is a special file that describes the folder and file hierarchy on a volume. Catalog file 303 occupies space 353 and contains vital information about all of the file and folders on a volume, as well as the catalog information for the files and folders that are stored in the catalog file. The catalog files are organized as a balanced tree to allow quick and efficient searches through a large folder hierarchy. In this example, catalog file 303 includes two nodes for the purposes of explanation. Catalog file 303 includes parent ID=2, nodeName=".journal" 321, and parent ID=2, nodeName=".journal_info_block" 323.

Journal info block 305 occupies space 355 of the memory space corresponding to journal 300. A journal info block, such as journal info block 305, is a journal data structure which describes where the journal header and journal buffer are stored. Typically, the journal info block is stored at the beginning of the allocation block referenced by the volume header as indicated by the arrow in FIG. 3. Journal info block 305 references journal header 307 and journal buffer 309. That is, the journal info block 305 indicates the location and size of both journal header 307 and the journal buffer 309.

Journal header 307 occupies space 357 of the data structure. Journal header 307 describes which part of the journal buffer 309 is active and contains transactions waiting to be committed. A transaction is a group of related changes. When all the changes of a transaction have been written to their normal locations on disk, that transaction has been committed and is removed from the journal. A journal may contain several transactions. Copying changes from all transactions to their normal locations on disk is referred to as "replaying" the journal. When the journal is replayed, journal header 307 is updated. Journal header 307 includes pointers to the beginning and end of the active transactions region 311 indicated by start 341 and end 343 arrows respectively.

Journal buffer 309 occupies space 351 of the journal data structure and, in at least certain embodiments, is treated as a circular buffer. When reading or writing the journal buffer, the I/O operation must stop at the end of journal buffer 309 and resume (wrap around) immediately following the journal header. Thus, only a portion of the journal buffer is active at any given time; this portion is indicated by the start and end field of the journal header, such as start 341 and end 343 pointers respectively. The part of the buffer that is not active contains no meaningful data and must be ignored. When the journal is not empty (contains transactions), it must be replayed to be sure the volume is consistent. That is, the data from each of the transactions must be written to the correct blocks on disk. In order to replay the journal, an implementation just loops over the transactions, copying each individual block in the transaction from the journal to its proper location on the volume. Once those blocks have been flushed to the media (not just the driver), it may update the journal header to remove the transactions.

Active transactions region 311 is within the journal buffer 309 which is the space set aside to hold the active transactions. In this example, active transactions region 311 occupies space 353 of the data structure which is a subset of space 351. The active transactions region 311 contains active transactions waiting to be committed. The active transactions (not shown) within active transactions region 311 include a transaction header and a group of one or more allocation blocks to be updated as discussed in FIG. 4.

Figure 4:
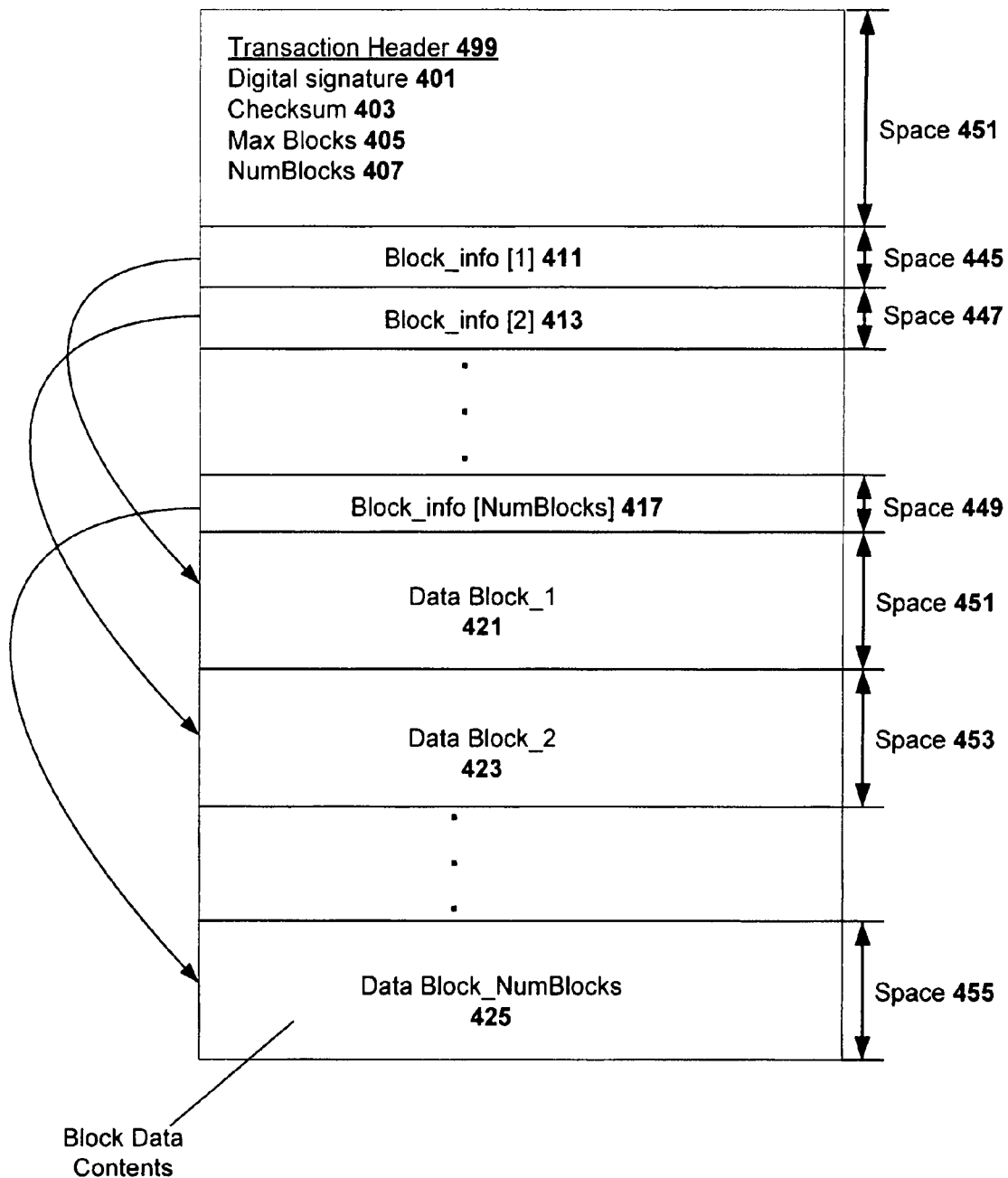
FIG. 4 illustrates an exemplary transaction according to one embodiment of the invention.

Referring to FIG. 4, which illustrates an exemplary transaction according to one embodiment of the invention. Transaction 400 is located within the active transaction region, such as active transactions region 311 of FIG. 3. Transaction 400 includes transaction header 499 located within space 451 of the memory space allocated to the transaction. A single transaction may consist of several data blocks to be updated to their normal data structures on disk, including both the data to be written and the location where the data is to be written. This is represented on disk by the transaction header, which describes the number and sizes of the blocks, immediately followed by the contents of those blocks. Since the transaction headers are of limited size, a single transaction may consist of several transaction headers and their associated block contents (one transaction header followed by the contents of the blocks that header describes, then the next transaction header and its block contents, and so on). As discussed above, the journal buffer, in at least certain embodiments, is a circular buffer and transactions wrap around in this way.

Transaction header 499 includes checksum 403, max blocks 405, and numblocks 407. A journal checksum, such as checksum 403, is included in both the transaction header and the transaction info blocks discussed below. These checksums can be verified as part of a basic consistency check of their associated data structures. To verify a checksum, the checksum of each data structure is temporarily set to zero. A checksum operation is then performed to calculate the checksum of the data structure. Typically, a checksum routine is performed on one of the address, size, or data within a data block and should result in a value equal to the original value in the checksum field associated with each data structure. Max block 405 is a number indicating the maximum blocks available for this particular transaction and numblocks 407 includes the actual number of blocks within a particular transaction and varies depending on the number of changes per transaction. Transaction 400 further includes block_info [1] 411, block_info [2] 413, and block_info (numblocks) 417 corresponding to data block_1 421, data block_2 423, and data block_Numblocks 425 respectively. Block_info [1] 411 occupies space 445 of the transaction header data structure and references data block_1 421 which occupies space 451 of the data structure. Each of data blocks 1-Numblocks represent the actual data contents of the blocks. As such, block_info [2] 413 and block_info [Numblocks] 417 reference data block_2 423 and data block_Numblocks 425 respectively.

Figure 5:
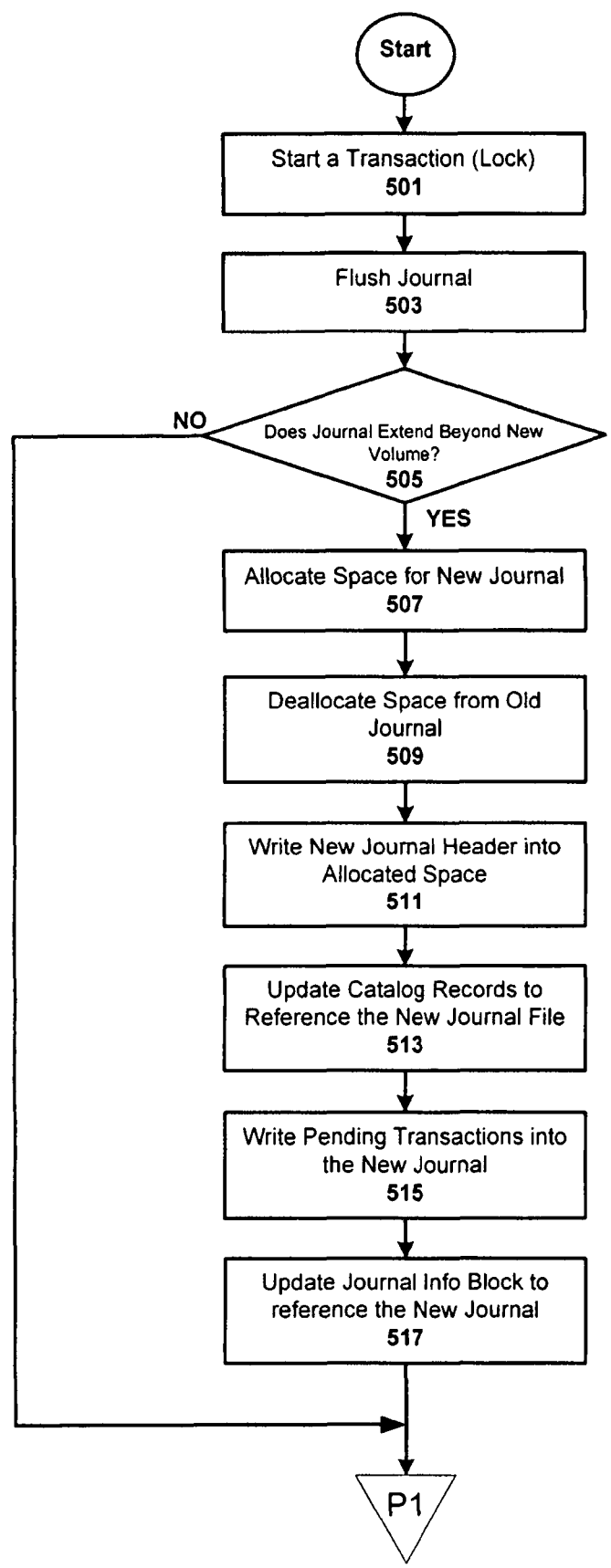
FIG. 5 illustrates an exemplary method for relocating a file system journal according to one embodiment of the invention.
Figure 7A:
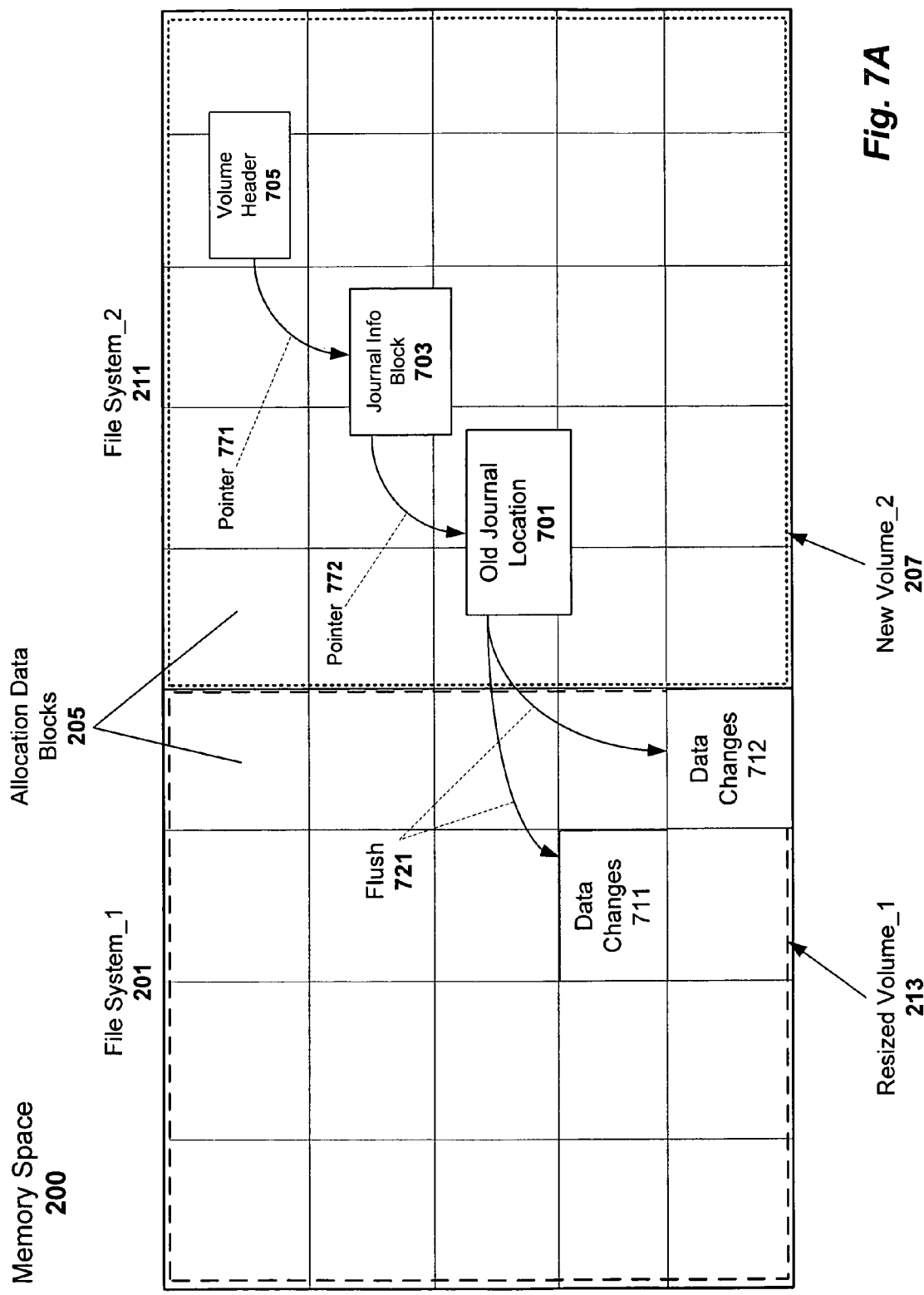
FIG. 7A illustrates flushing a file system journal within an exemplary partitioned memory space containing a resized volume associated with a first file system and a new volume associated with a second file system.

FIG. 5 illustrates an exemplary method for relocating a file system journal according to one embodiment of the invention. Method 500 is part of a routine or process that relocates the journal itself. At operation 501, a transaction is started. In one embodiment, the journaling subroutine in the journaling code locks the journal so that only the subroutine gets access to modifying the journal during the relocation process. In operation 503, the active transactions waiting to be committed within a journal buffer of the file system journal to be relocated are flushed. This is shown in FIG. 7A, which illustrates flushing a file system journal within an exemplary partitioned memory space containing a resized volume associated with a first file system and a new volume associated with a second file system. In FIG. 7A, memory space 200 includes file system_1 201 and file system_1 211 corresponding to resized volume_1 213 and new volume_2 207 respectively. In this example, old journal location 701 is located within the volume corresponding to file system_2 211 even though old journal location 702 corresponds to file system_1 201. Accordingly, old journal location 701 will be subject to relocation according to the underlying principles of the invention. Memory space 200 further includes volume header 705 which contains pointer 771 to reference journal info block 703. Journal info block 703 includes pointer 772 to reference old journal location 701. When operation 503 of FIG. 5 is performed, old journal location 701 flushes the data changes, i.e., data changes 711 and 712 associated with an active transaction within the journal buffer (not shown). This is shown in FIG. 7A as flush 721. When old journal location 701 flushes its data changes, the allocation blocks are updated with new data as shown in the figure.

At operation 505 of method 500, it is determined whether the file system journal extends beyond or into the newly created volume new volume_2 207. If the file system journal does not extend into new volume_2 207 corresponding to file system_1 211, then control automatically flows to P1 of FIG. 6. If, on the other hand, in operation 505 it is determined that the old journal extends into the new volume, control flows to operation 507 where space within resized volume_1 213 is allocated for the new journal. FIG. 7B illustrates writing a new file system journal within an exemplary partitioned memory space containing a resized volume associated with a first file system and a new volume associated with a second file system. In the case of FIG. 7B, old journal location 701 is located within new volume_2 207 and is, therefore, subject to relocation. Old journal location 701 is de-allocated in operation 509 and the new journal header is written to the new journal location 751 at operation 511. The catalog records associated with the file system journal are updated to reference the new file system journal at operation 513. Additionally, at operation 515, all pending data structure changes within the journal buffer (not shown) of old journal location 701 are written into a new journal located at new journal location 751 of FIG. 7B. The pending transactions are for the metadata changes from operations 507 and 509, and for updating the catalog records. Writing the pending transactions into the new journal at operation 515 guarantees those prior metadata changes are actually in the journal buffer and that the journal header's end pointer has been updated.

FIG. 7C illustrates updating a journal info block to reference a new file system journal within an exemplary partitioned memory space containing a resized volume associated with a first file system and a new volume associated with a second file system. At operation 517 of method 500, the journal info block 703 is updated to reference the new journal within new journal location 751. This is shown in FIG. 7C as pointer 773. Pointer 772 which references old journal location 701 is no longer needed.

Figure 6:
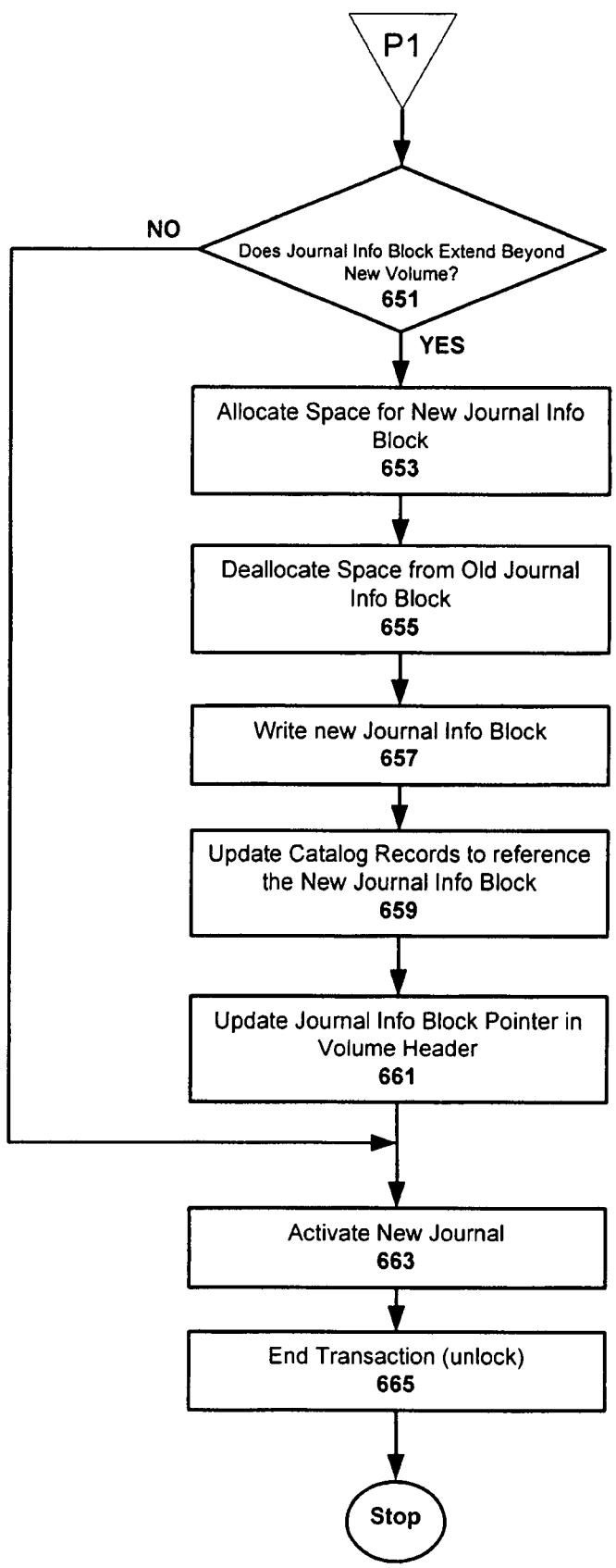
FIG. 6 illustrates an exemplary method for relocating a journal info block according to one embodiment of the invention.
Figure 7B:
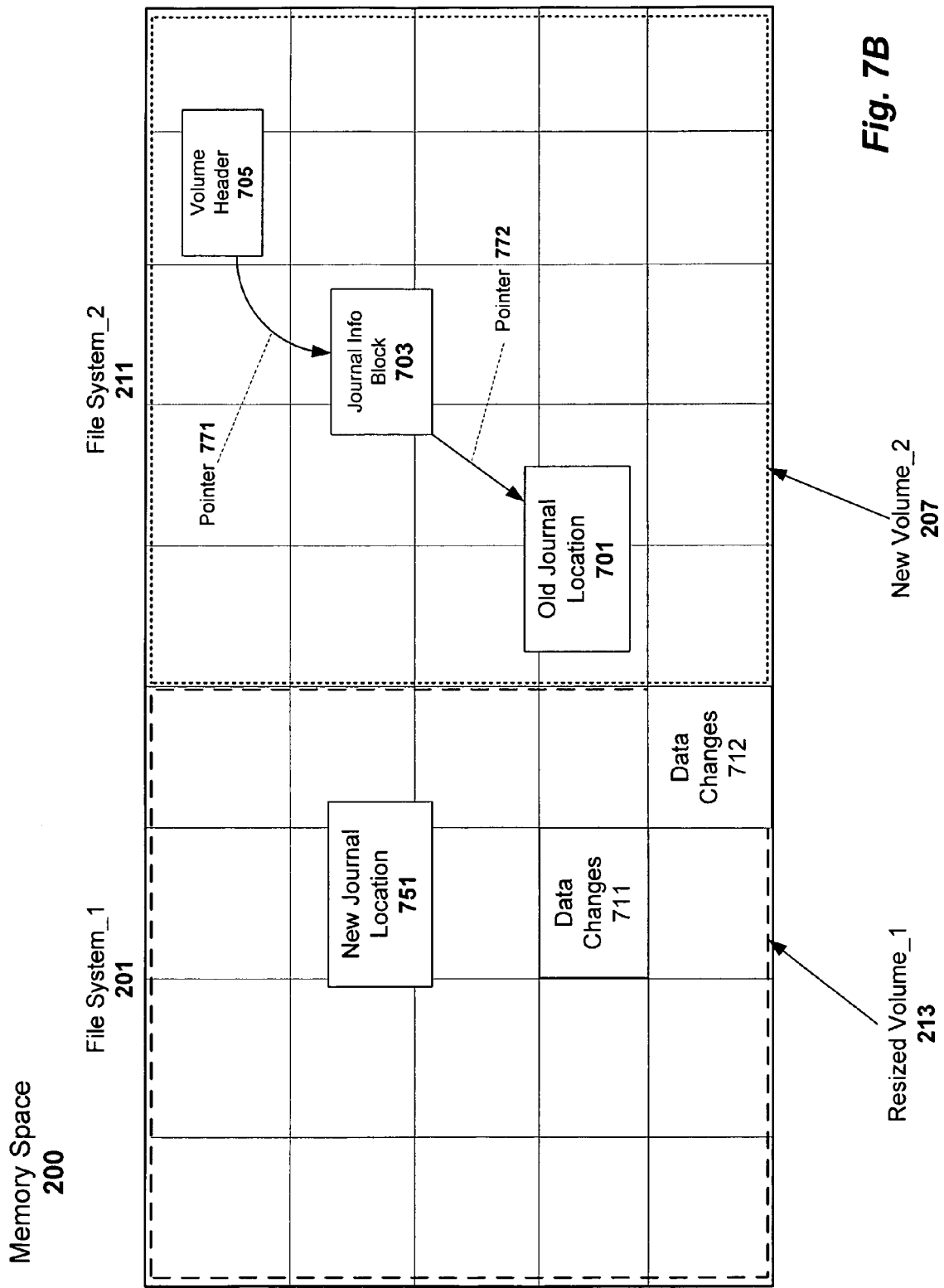
FIG. 7B illustrates writing a new file system journal within an exemplary partitioned memory space containing a resized volume associated with a first file system and a new volume associated with a second file system.
Figure 8A:
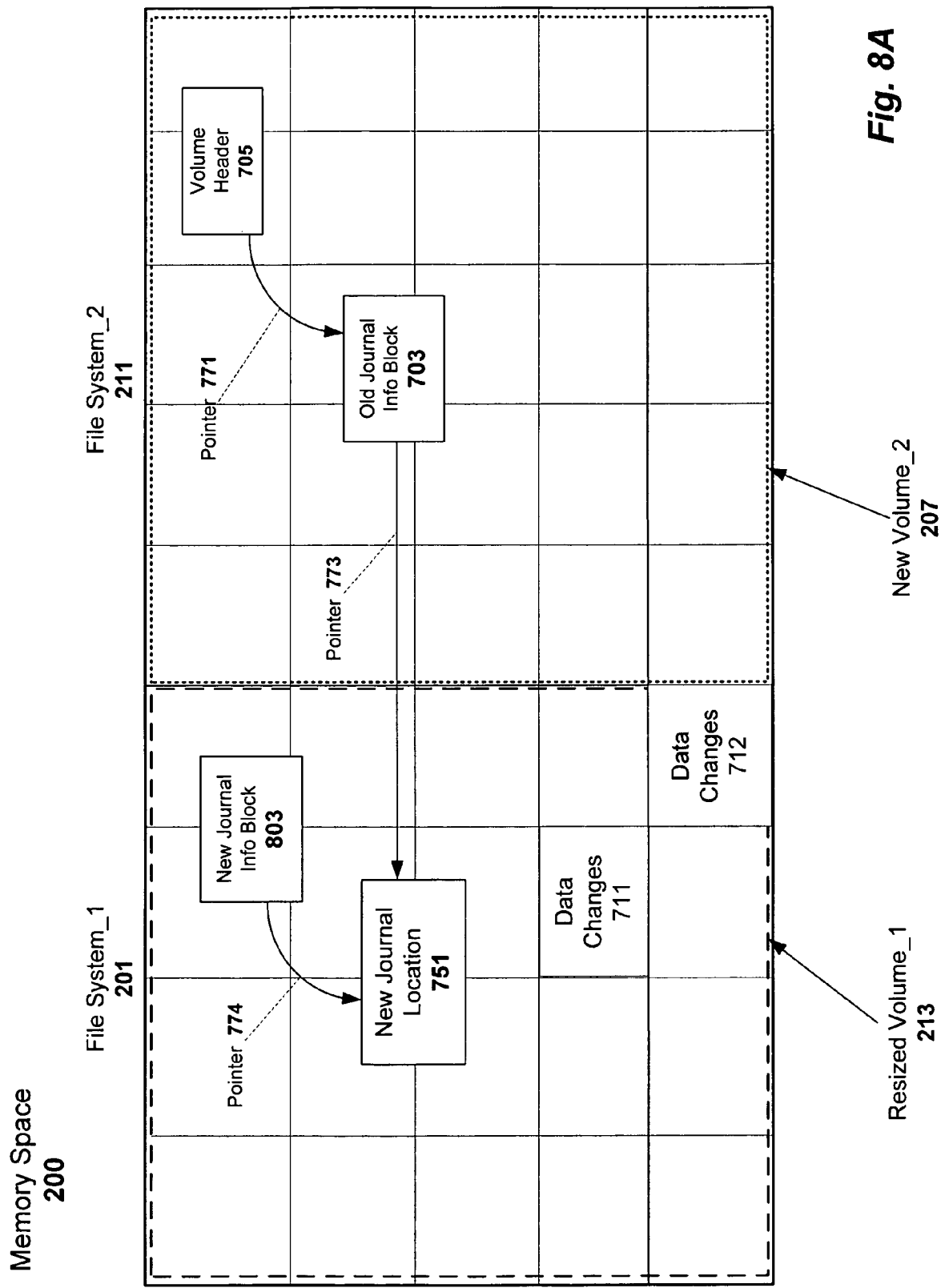
FIG. 8A illustrates writing a new journal info block within an exemplary partitioned memory space containing a resized volume associated with a first file system and a new volume associated with a second file system.

Control flows to P1 of FIG. 6, where at operation 651, it is determined whether the journal info block extends beyond the new volume. If the journal info block does not extend into new volume_2 207 corresponding to file system_1 211, then control automatically flows to operation 663 and the process for relocating the active file system journal is complete. If, on the other hand, it is determined that that the journal info block extends into the new volume, control flows to operation 653 where space is allocated for new journal info block 803 within resized volume_1 213 corresponding to file system_1 201. This is shown in FIG. 8A, which illustrates writing a new journal info block within an exemplary partitioned memory space containing a resized volume associated with a first file system and a new volume associated with a second file system. In FIG. 8A, new journal info block 803 is relocated into the volume corresponding to file system_1 201. That is, new journal info block 803 is written into resized volume_1 213 corresponding to file system_1 201. This occurs since old journal info block 703 was located within new volume_2 207 corresponding to file system_1 211 and required relocation. Control flows to operation 655 of FIG. 6 where the memory space associated with old journal info block 703 is de-allocated. The new journal info block 803 is written into resized volume_1 213 at operation 657. New journal info block 803 includes a reference to the new file system journal in new journal location 751 represented as pointer 774.

Figure 8B:
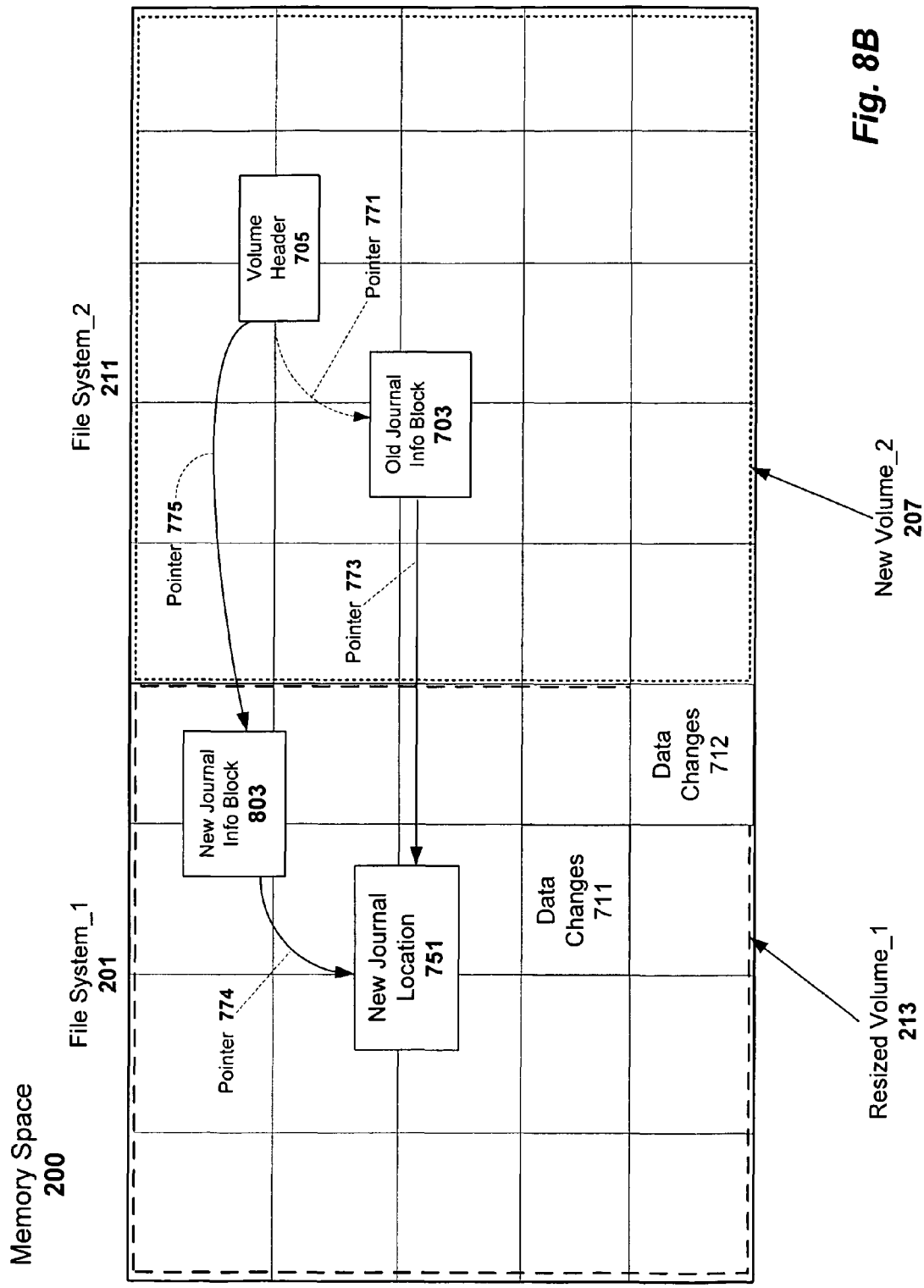
FIG. 8B illustrates updating a volume header to reference a new journal info block within an exemplary partitioned memory space containing a resized volume associated with a first file system and a new volume associated with a second file system.

At operation 659, the catalog records are updated to reference the new journal info block, and, in operation 661, volume header 705 is updated to reference new journal info block 803. This is shown in FIG. 8B, which illustrates updating a volume header to reference a new journal info block within an exemplary partitioned memory space containing a resized volume associated with a first file system and a new volume associated with a second file system. In FIG. 8B, volume header 705 includes a reference to new journal info block 803 represented as pointer 775. Accordingly, pointer 771 referencing old journal info blocks 703 is no longer necessary. Furthermore, pointer 773 which references new journal location 751 remains within old journal info block 703; however, this pointer is no longer necessary since old journal info block 703 has been de-allocated.

Once volume header 705 is updated to reference new journal info block 803, the new file system journal located in new journal location 751 is activated at operation 663. Pending transactions within the journal buffer (not shown) of the new journal may then be written to their normal data structures within the physical memory space. As before, the pending transactions mean the metadata changes in operations 653, 655 and 659. They get written to the journal buffer at new journal location 751 (if the journal needed to be relocated), and the journal header's end pointer is updated to include those blocks of data. Of course, those metadata changes (plus those from 507, 509 and 515) are what later get written to disk in "flush" operation 821 associated with FIG. 8C (called data changes 851 and 853). Finally, at operation 665 the transaction is ended and the journal is unlocked allowing other processes access to modifying the journal.

Figure 8C:
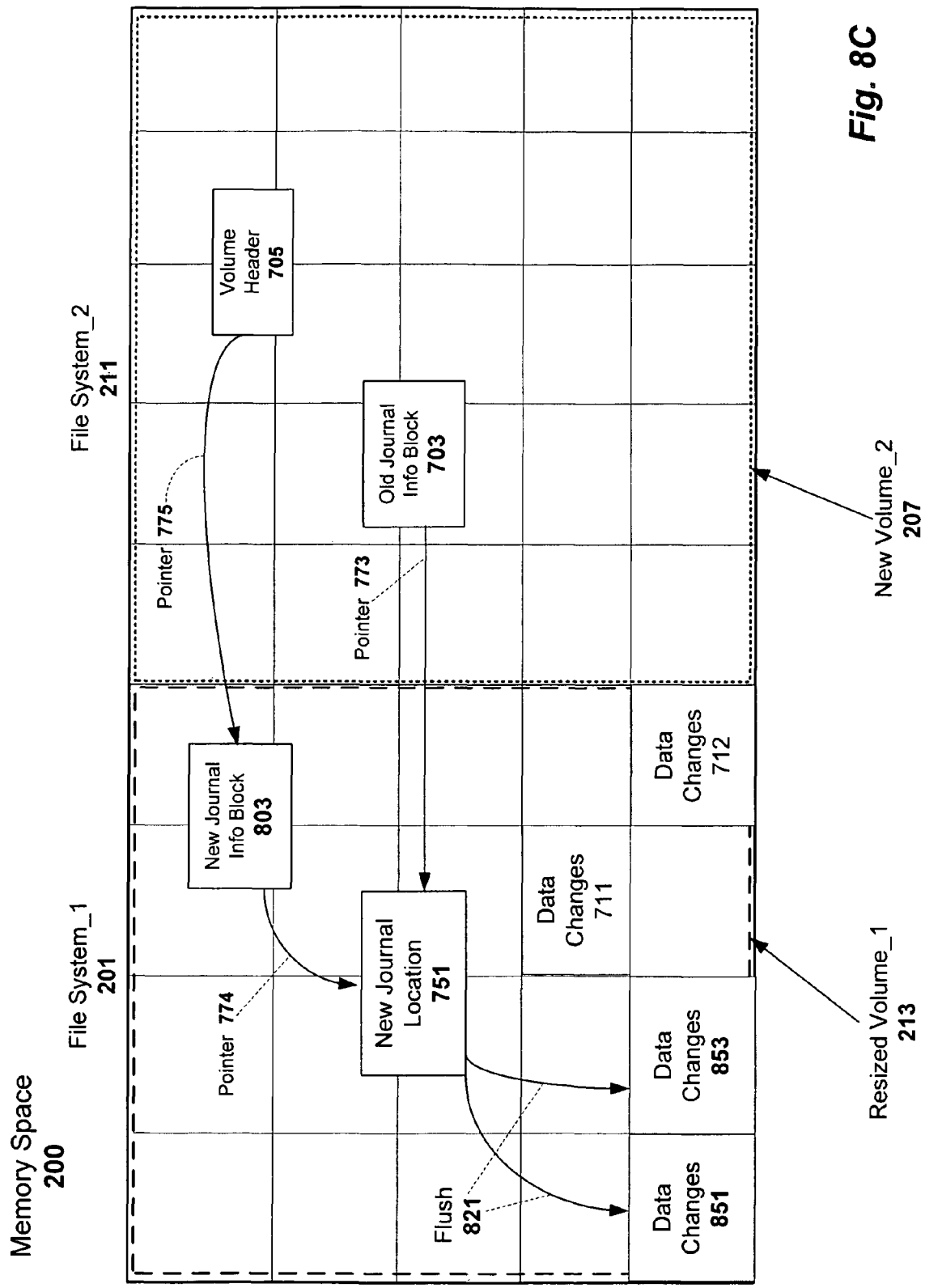
FIG. 8C illustrates flushing a new active file system journal within an exemplary partitioned memory space containing a resized volume associated with a first file system and a new volume associated with a second file system.

FIG. 8C illustrates flushing a new active file system journal within an exemplary partitioned memory space containing a resized volume associated with a first file system and a new volume associated with a second file system. After activating the new journal, the new journal can perform flush 821 to write data changes 851 and 853 safely without causing an inconsistent state within the resized volume corresponding to file system_1 201 in the event of a loss of power or system crash.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. For example, embodiments of the invention described herein have been limited to two volumes associated with two file systems within a physical memory space. However, the invention may be utilized with any number of volumes and their associated file systems. Additionally, embodiments of the invention have been described in terms of a contiguous physical memory space, such as memory space 200. However, the invention could also be implemented in an interleaved memory space or any other memory space arrangement where a partition between volumes is made.

Accordingly, the scope and spirit of the invention should be judged in terms of the claims which follow.

What is claimed is:

1. A computer implemented method comprising:
determining if a file system journal is subject to relocation to a new file system journal for a file system, the file system corresponding to data structures stored in a storage device, wherein at most one of the file system journal and the new file system journal is active to include entries describing changes to the file system before update of the changes to the data structures, wherein the storage device stores the entries included in the one file system journal which is active to allow replay of the update of the changes to the data structures, wherein the file system journal is subject to the relocation if the file system journal extends beyond a partition of memory space, and wherein the relocation includes transactions corresponding to additional changes to the file system;
if the file system journal is subject to the relocation, updating the new file system journal with entries describing the additional changes for the relocation before update of the additional changes to the data structures, wherein the new file system journal includes the entries describing the additional changes for relocating the file system journal when the new file system journal is not active; and
activating the new file system journal such that when the new file system journal is active the new file system journal includes the entries describing the additional changes and the entries included in the one file system journal to allow the replay of the update of the changes and the update of the additional changes to the data structures from the storage device.

2. The method of claim 1, wherein the transactions comprise:
resizing the file system located within the memory space;
allocating a first location in the resized file system for the new file system journal if the file system journal is located outside the resized file system;
writing the new file system journal to the first allocated location;
writing data structure changes for relocating the file system journal into the new file system journal, the new file system journal remaining inactive; and
updating the location of the new file system journal in a journal data structure.

3. The method of claim 1, further comprising:
writing modified blocks from active transactions waiting to be committed to the new file system journal; and
flushing the modified blocks in the new file system journal to the data structures for the resized file system when the new file system journal is activated.

4. The method of claim 2, wherein writing the new file system journal includes writing a new journal header to describe which part of a journal buffer contains the active transactions waiting to be committed.

5. The method of claim 2, wherein the journal data structure is a journal info block, and wherein the journal info block is updated to reference the new file system journal.

6. The method of claim 2, wherein the relocation is treated as if it never began if there is a system failure before the new file system journal is activated.

7. The method of claim 5, wherein the transactions further comprise:
allocating a second location in the resized file system for a new journal info block if the journal info block is located outside the resized file system;
writing the new journal info block to the second allocated location; and updating a volume header to reference the new journal info block.

8. The method of claim 7, wherein the transactions further comprise updating catalog records to reference the new file system journal and the new journal info block.

9. A machine-readable non-transitory storage medium that provides instructions, which when executed by a machine, cause the machine to perform a method comprising
determining if a file system journal is subject to relocation to a new file system journal for a file system in a partition of a memory space, the file system corresponding to data structures stored in a storage device, wherein at most one of the file system journal and the new file system journal is active to include entries describing changes to the file system before update of the changes to the data structures, wherein the storage device stores the entries included in the one file system journal which is active to allow replay of the update of the changes to the data structures, wherein the file system journal is subject to the relocation if the file system journal extends beyond the partition of the memory space, and wherein the relation includes transactions corresponding to additional changes to the file system;
if the file system journal is subject to the relocation, updating the new file system journal with entries describing the additional changes for the relocation before update of the additional changes to the data structures, wherein the new file system journal includes the entries describing the additional changes for relocating the file system journal when the new file system journal is not active; and
activating the new file system journal such that when the new file system journal is active, the new file system journal includes the entries describing the additional changes and the entries includes in the one file system journal to allow the replay of the update of the changes and the update of the additional changes to the data structures from the storage device.

10. The method of claim 9, wherein the transactions comprise:
resizing a file system residing within the memory space;
allocating a first location in the resized file system for the new file system journal if the file system journal is located outside the resized file system;
writing the new file system journal to the first allocated location;
writing data structure changes for relocating the file system journal into the new file system journal, the new file system journal remaining inactive; and
updating the location of the new file system journal in a journal data structure.

11. The medium of claim 9, further comprising:
writing modified blocks from active transactions waiting to be committed to the new file system journal; and
flushing the modified blocks written into the new file system journal to normal data structures for the resized system when the new file system journal is activated.

12. The medium of claim 10, wherein writing the new file system journal includes writing a new journal header to describe which part of a journal buffer contains the active transactions waiting to be committed.

13. The medium of claim 10, wherein the journal data structure is a journal info block, which is updated to reference the new file system journal.

14. The medium of claim 13, wherein the transactions further comprise:
allocating a second location in the memory space for a new journal info block if the journal info block is located outside the resized file system;
writing the new journal info block to the second allocated location; and
updating a volume header to reference the new journal info block.

15. The medium of claim 14, wherein the transactions further comprise updating catalog records to reference the new file system journal and the new journal info block.

16. The medium of claim 10, wherein the relocation is treated as if it never began if there is a system failure before the new file system journal is made active.

17. An apparatus comprising:
a memory storing executable instructions and a resizable file system including a file system journal, the resizable file system allocated in a partition of a memory space;
a storage device storing data structures corresponding to the resizable file system; and
a processor coupled to the memory and the storage device to execute the executable instructions from the memory, the processor being configured to
determine if the file system journal is subject to relocation to a new file system journal in the memory space, wherein at most one of the file system journal and the new file system journal is active to include entries describing changes to the resizable file system before update of the changes to the data structures, wherein the storage device stores the entries included in the one file system journal which is active to allow replay of the update of the changes to the data structures, wherein the file system journal is subject to the relocation if the file system journal extends beyond the partition of the memory space, and wherein the relocation includes transactions corresponding to additional changes to the file system,
update, if the file system journal is subject to relocation, the new file system journal with entries describing the additional changes for the relocation before update of the additional changes to the data structures, wherein the entries describing the additional changes allow replay of the update of the additional changes to the data structures, and wherein the new file system journal includes the entries describing the additional changes for relocating the file system journal when the new file system journal is not active, and activate the new file system journal such that when the new file system journal is active, the new file system journal includes the entries describing the additional changes and the entries included in the one file system journal to allow the replay of the update of the changes and the update of the additional changes to the data structures from the storage device.

18. The apparatus of claim 17, wherein the transactions comprise:
resizing the resizable file system located in the memory space;
allocating a first location in the resized file system for the new file system journal if the file system journal is located outside the resized file system;
writing the new file system journal to the first allocated location;
writing data structure changes for relocating the file system journal into the new file system journal, the new file system journal remaining inactive; and updating the location of the new file system journal in a journal data structure.

19. The apparatus of claim 17, wherein
modified blocks from active transactions waiting to be committed are also written to the new file system journal; and
the modified blocks written to the new file system journal are flushed to the data structures for the resized file system when the new file system journal becomes active.

20. The apparatus of claim 18, wherein writing the new file system journal includes writing a new journal header to describe which part of a journal buffer contains the active transactions waiting to be committed.

21. The apparatus of claim 18, wherein the journal data structure is a journal info block data structure, which is updated to reference the new file system journal.

22. The apparatus of claim 21, wherein the transactions further comprise:
allocating a second location in the resized file system for a new journal info block if the journal info block is located outside the resized file system;
writing a new journal info block to the second allocated location; and
updating a volume header to reference the new journal info block.

23. The apparatus of claim 18, wherein the transactions further comprises updating catalog records to reference the new file system journal and the new journal info block.

24. A data processing machine comprising
means for determining if a file system journal is subject to relocation to a new file system journal for a file system in a partition of a memory space, the file system corresponding to data structures stored in a storage device, wherein at most one of the file system journal and the new file system journal is active to include entries describing changes to the file system before update of the changes to the data structures, wherein the storage device stores the entries included in the one file system journal which is active to allow replay of the update of the changes to the data structures, wherein the file system journal is subject to the relocation if the file system journal extends beyond the partition of the memory space, and wherein the relocation includes transactions corresponding to additional changes to the file system;
means for, if the file system journal is subject to relocation, updating the new file system journal with entries describing the additional changes for the relocation before update of the additional changes to the data structures, wherein the new file system journal includes entries describing the additional changes for relocating the file system journal when the new file system journal is not active; and
means for activating the new file system journal such that when the new file system journal is active, the new file system journal includes the entries describing the additional changes and the entries included in the one file system journal to allow the replay of the update of the changes and the update of the additional changes to the data structures from the storage device.

25. The machine of claim 24, wherein the transactions comprise:
resizing the file system located within the memory space;
allocating a first location in the resized file system for the new file system journal if the file system journal is located outside the resized file system;
writing the new file system journal to the first allocated location;
writing data structure changes for relocating the file system journal into the new file system journal, the new file system journal remaining inactive; and
updating the location of the new file system journal in a journal data structure.

* * * * *

UNITED STATES PATENT AND TRADEMARK OFFICE
CERTIFICATE OF CORRECTION

| | | |
|---|---|---|
| PATENT NO. | : 8,145,604 B2 | Page 1 of 1 |
| APPLICATION NO. | : 11/975487 | |
| DATED | : March 27, 2012 | |
| INVENTOR(S) | : Day | |

It is certified that error appears in the above-identified patent and that said Letters Patent is hereby corrected as shown below:

Cover Page:

In section (54), delete, "METHOD AND APPARATUS FOR RELOCATING AN ACTIVE FIVE SYSTEM JOURNAL" and insert -- METHOD AND APPARATUS FOR RELOCATING AN ACTIVE FILE SYSTEM JOURNAL --.

Signed and Sealed this
First Day of May, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 8,145,604 B2 | Page 1 of 1 |
| APPLICATION NO. | : 11/975487 | |
| DATED | : March 27, 2012 | |
| INVENTOR(S) | : Day | |

It is certified that error appears in the above-identified patent and that said Letters Patent is hereby corrected as shown below:

Title Page, Item (54) and at Column 1, lines 1-3, Title,

Delete, "METHOD AND APPARATUS FOR RELOCATING AN ACTIVE FIVE SYSTEM JOURNAL" and insert -- METHOD AND APPARATUS FOR RELOCATING AN ACTIVE FILE SYSTEM JOURNAL --.

This certificate supersedes the Certificate of Correction issued May 1, 2012.

Signed and Sealed this
Twenty-ninth Day of May, 2012

David J. Kappos
*Director of the United States Patent and Trademark Office*